(12) United States Patent
Nosker et al.

(10) Patent No.: US 9,533,432 B2
(45) Date of Patent: Jan. 3, 2017

(54) JUST-IN-TIME COMPOUNDING IN AN INJECTION MOLDING MACHINE

(75) Inventors: Thomas Nosker, Stockton, NJ (US); Jennifer Lynch, Franklin Park, NJ (US); Keith Luker, Patterson, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 317 days.

(21) Appl. No.: 13/454,035

(22) Filed: Apr. 23, 2012

(65) Prior Publication Data

US 2013/0072627 A1   Mar. 21, 2013
US 2016/0167253 A9   Jun. 16, 2016

Related U.S. Application Data

(63) Continuation-in-part of application No. 12/922,940, filed as application No. PCT/US2009/037552 on Mar. 18, 2009, now Pat. No. 8,497,324.

(60) Provisional application No. 61/037,504, filed on Mar. 18, 2008, provisional application No. 61/477,826, filed on Apr. 21, 2011.

(51) Int. Cl.
| | |
|---|---|
| *B29C 45/47* | (2006.01) |
| *B29B 7/80* | (2006.01) |
| *B29C 45/18* | (2006.01) |
| *C08L 67/03* | (2006.01) |

(52) U.S. Cl.
CPC ............... *B29B 7/80* (2013.01); *B29C 45/18* (2013.01); *B29C 45/1866* (2013.01); *B29C 45/47* (2013.01); *C08L 67/03* (2013.01)

(58) Field of Classification Search
CPC ........ B29B 7/80; B29C 45/1866; B29C 45/18; B29C 45/47; B29C 45/60; B29C 2045/466; B29C 47/1081

USPC ........... 264/328.14; 366/76.6, 76.9; 425/587; 524/605
See application file for complete search history.

(56) References Cited

U.S. PATENT DOCUMENTS

| | | | | |
|---|---|---|---|---|
| 4,409,164 A | * | 10/1983 | Brasz et al. | 264/50 |
| 4,657,499 A | * | 4/1987 | Lewellen et al. | 425/208 |
| 4,663,388 A | | 5/1987 | Douglass et al. | |
| 5,030,662 A | | 7/1991 | Banerjie | |
| 5,098,267 A | * | 3/1992 | Cheng | 425/4 R |
| 5,130,076 A | * | 7/1992 | Blatz et al. | 264/540 |
| 5,212,223 A | | 5/1993 | Mack et al. | |

(Continued)

FOREIGN PATENT DOCUMENTS

| | | |
|---|---|---|
| WO | 06125111 A1 | 11/2006 |
| WO | 09117509 A2 | 9/2009 |

*Primary Examiner* — Jill Heitbrink
(74) *Attorney, Agent, or Firm* — Fox Rothschild LLP

(57) ABSTRACT

A plastication unit for an injection molding machine, combining a heated plastication barrel with an entrance port and an exit port on opposing ends of the barrel; a hopper positioned to deliver ingredients to be compounded for injection molding to the entrance port of the barrel; and a helical plastication screw rotatably carried within the barrel and running the length of the barrel between the entrance and exit ports, which is operable to rotate and transmit the ingredients along the length of the barrel; wherein the plastication screw has at least one axial fluted extensional mixing element segment and the ingredients include at least one polymer for injection molding. Methods for injection molding with the plastication unit of the present invention and articles formed by the inventive methods are also disclosed.

19 Claims, 5 Drawing Sheets

(56) References Cited

U.S. PATENT DOCUMENTS

| | | | |
|---|---|---|---|
| 5,298,214 | A | 3/1994 | Morrow et al. |
| 5,615,158 | A | 3/1997 | Ochoa et al. |
| 5,789,477 | A | 8/1998 | Nosker et al. |
| 5,916,932 | A | 6/1999 | Nosker et al. |
| 5,985,200 | A * | 11/1999 | Vermilion et al. ....... 264/328.17 |
| 6,136,246 | A * | 10/2000 | Rauwendaal et al. ... 264/211.21 |
| 6,191,228 | B1 | 2/2001 | Nosker et al. |
| 6,227,692 | B1 * | 5/2001 | Heathe ............................ 366/81 |
| 6,828,372 | B2 | 12/2004 | Sullivan et al. |
| 6,962,431 | B1 | 11/2005 | Luker |
| 2003/0128623 | A1 * | 7/2003 | Leveque ......................... 366/81 |
| 2005/0192403 | A1 | 9/2005 | Nosker |
| 2006/0083105 | A1 * | 4/2006 | MacDonald et al. ........... 366/80 |

\* cited by examiner

JUST-IN-TIME COMPOUNDING IN AN INJECTION MOLDING MACHINE

CROSS REFERENCE TO RELATED APPLICATIONS

The present application claims priority to under 35 U.S.C. §119(e) to U.S. Provisional Patent Application Ser. No. 61/477,826, filed Apr. 21, 2011, the contents of which are hereby incorporated by reference.

BACKGROUND OF THE INVENTION

The plastics manufacturing industry is typically required to compound one to five percent of a pelletized additives package into bulk polymer resin to fabricate plastic parts because of the poor mixing capability of single screw extrusion (SSE) and injection molding (IM) machines. The additives package is a pre-compounded concentrate of functional particles, such as a pigment, and base polymer resin that aids in mixing functional particles within the bulk resin. Pigment additive packages are more commonly known as a color masterbatch. Although the additives package is the minor component, it is typically more costly than the bulk resin.

The base polymer in an additives package is often a low molecular weight polymer with poor mechanical properties. In addition, the base polymer is subject to two shear and heat histories, once during the pre-compounding step, as in extrusion, and secondly during the part fabrication step, as in IM. Subjecting the polymer to multiple processing steps has its disadvantages. For example, every time a polymer is subject to heat and shear forces there is potential for degradation, chemical or otherwise. Multiple processing steps have been found to coarsen the morphology of a previously well mixed system. Mechanical properties are dependent upon morphology; and particles may tend to agglomerate during extrusion. Additionally, multiple processing steps increase manufacturing costs and time.

With injection molding, granular plastic is fed by gravity from a hopper into a heated barrel. The granules are slowly moved forward by a screw-type plunger, i.e., the plastication screw, by which the plastic is forced into a heated chamber, where it is melted. As the plastication screw advances, the melted plastic is forced through a nozzle for delivery to the mold.

Dispersing and distributing pigment, modifiers, filler, particles, reinforcing agents, and other various compounds within a polymer matrix for injection molding are difficult. In most cases, twin screw extrusion (TSE) is commonly used for pre-compounding in order to achieve good mixing. However, single screw extrusion (SSE) offers several advantages, including lower cost, rugged machinery more resistant to abuse, easy and inexpensive part replacement, widely available new or used equipment, easy operation, lower back pressures, and the ability to combine compounding and final product extrusion as a single operation.

Industrial SSE use has lagged because extruders with single screw flights have lacked the multiple elongational flow fields of multi-screw extruders (MSE), which provide simple upstream axial mixing and the ability to degas during mixing. To achieve good dispersion, surface treatments are employed with SSE to promote wetting by the polymer but have not been fully successful nor duplicated the effect of mixing alone achieved with multi-screw extruders. Controlled feeding/melting mechanisms are used with SSE to decrease agglomerate formation and reduce the dispersion necessary for good mixing. To enhance distributive mixing, starve feeding may be used, if the polymer is not subject to degradation. SSE is intrinsically limited in dispersive and distributive mixing but good dispersion can often be achieved by using specialized additives, whereas distributive mixing can equal any MSE compounder with retrofitted mixing devices. The function of SSE has changed from only plasticating to both plasticating and mixing, achievable by adding a mixing element to the screw.

There are several types of mixing elements suitable for SSE, each with their own advantages and disadvantages. For homogeneity, a combination of both dispersive and distributive mixing is optimal, specifically dispersion followed by distribution. There are no standardized ways to evaluate the compounding ability of a mixer because this will vary with the additives being compounded. For example, it is difficult to quantitatively measure dispersion of filler particles in heavily filled thermoplastics. Comparative studies have been performed in which different types of mixing elements are investigated to improve mixing of hybrid materials systems in SSE. And, there have been attempts to reduce manufacturing costs by improving the compounding role of SSE used in final product manufacture, specifically examining powders in polyolefins and typical liquid additives in various polymers. However SSE is still considered generally unsuitable for dispersive mixing of powders and liquids into polymers, particularly during the plastication step of an injection molding cycle. There remains a need for an SSE capable of achieving distributive mixing of powder and liquid additives in a polymer melt during the plastication step of an injection molding cycle.

SUMMARY OF THE INVENTION

This need is met by the present invention. It has now been discovered that axial fluted extensional mixing elements can be incorporated into the plastication screw of an injection molding machine in order to compound and fabricate articles in a one-step, novel injection molding process.

Therefore, according to one aspect of the present invention, a plastication unit for an injection molding machine is provided having a heated plastication barrel with an entrance port and an exit port on opposing ends of the barrel; a hopper positioned to deliver ingredients to be compounded for injection molding to the entrance port of the barrel; and a helical plastication screw rotatably carried within the barrel and running the length of the barrel between the entrance and exit ports, which is operable to rotate and transmit the ingredients along the length of said barrel; wherein the plastication screw has at least one axial fluted extensional mixing element segment and the ingredients include at least one polymer for injection molding.

Embodiments are provided in which the plastication screw contains a plurality of elements for mixing and conveying the ingredients to be compounded and injection molded. In one embodiment, the plastication screw includes a conveyor segment positioned to receive the ingredients to be compounded from the hopper and to convey the ingredients to the mixing element segment. In another embodiment, the plastication screw further includes a second conveyor segment positioned to receive the compounded ingredients from the mixing element segment and to convey the compounded ingredients along the barrel in the direction of the exit port. In another embodiment, the plastication screw further includes a second axial fluted extensional mixing element segment positioned between the second conveyor segment and the exit port to receive the compounded ingredients for further mixing. In yet another embodiment, the plastication screw further includes a third conveyor segment positioned to receive compounded ingredients from the second mixing element segment and to convey the compounded ingredients to the exit port. The plurality of elements in the foregoing embodiments are configured on a single plastication screw driven by a single drive motor.

The present invention further incorporates the discovery that ingredients to be compounded for injection molding can be thoroughly mixed by an axial fluted extensional mixing element with a short length to diameter ratio, making it possible to configure the plastication unit of an injection molding system with a mixing element to mix together an injection molding composition as part of the injection molding process. According to one embodiment, the mixing element segment has a length to diameter ratio of less than 30:1. In a more specific embodiment, the mixing element segment has a length to diameter ratio between about 12:1 and about 30:1.

Configuring the plastication screw with multiple mixing element segments makes it possible to deliver the ingredients to be compounded in stages, According to one embodiment, the barrel of the plastication unit further includes an intermediate port positioned to deliver additional ingredients to be compounded either to a second conveyor segment for delivery to a second mixing element segment, or directly to a second mixing element segment. In another embodiment, a second hopper is positioned to deliver additional ingredients to the intermediate port.

The plastication unit of the present invention can be retrofitted to existing injection molding systems. According to another aspect of the present invention, new and retrofitted injection molding machines are provided, incorporating the plastication unit of the present invention.

The plastication unit of the present invention makes possible the compounding of injection molding compositions just before the injection molding of the composition. Therefore, according to another aspect of the present invention, injection molding methods are provided that include the steps of:
  feeding a blend of ingredient to be compounded for injection molding containing at least one polymer to the entrance port of the plastication unit of the present invention, wherein the barrel of the unit is heated above the compounding temperature of the blend; and
  transmitting the blend along the length of the heated barrel with the plastication screw of the plastication unit, so that the ingredients are heated to a flowable state for injection molding and mixed by a mixing element segment of the plastication screw to form a uniform homogenous flowable mass of a composition for injection molding.

According to one embodiment, the flowable mass is directly delivered from the exit port of the barrel of the plastication unit into a mold cavity and a molded article is formed.

The blend of ingredients that is compounded and promptly injected into a mold cavity are known injection molding polymers and additives. In one embodiment, the blend of ingredients includes a thermoplastic polymer. In another embodiment, the blend of ingredients includes a blend of two or more polymers. In another multi-polymer embodiment, two or more polymers are immiscible. In yet another embodiment, the blend of ingredients includes at least one polymer for injection molding and one or more compounding additives. According to a more specific embodiment, the compounding additives are independently selected from pigments, colorants, modifiers, fillers, particles and reinforcing agents. In an even more specific embodiment, the reinforcing agents are reinforcing fibers. Most specifically, the reinforcing fibers are glass fibers.

By combining compounding and injection molding into a single step, the heat and shear history experienced by the molded polymer is reduced, which results in a molded polymer with improved mechanical properties. Therefore, according to another aspect of the present invention, a molded plastic article is provided, formed by the method of the present invention.

A more complete appreciation of the invention and many other intended advantages can be readily obtained by reference to the following detailed description of the invention and claims in conjunction with the accompanying drawings.

DETAILED DESCRIPTION OF THE INVENTION

The present invention utilizes a compounding mixer for use with SSE, termed an axial fluted extensional mixing element (AFEM). A preferred AFEM is disclosed in U.S. Pat. No. 6,962,431 to Luker, the contents of which are herein incorporated by reference. The present invention incorporates at least one AFEM into the plastication screw of an IM machine in order to compound and fabricate parts in a one-step, novel IM process. The AFEM promotes multiple elongational flow fields, upstream axial mixing, and thin film degassing. The open flutes in the AFEM do not require high pressure and allow material flow to leave the mixing element to continue down the length of the screw or to re-enter another flute and "recirculate" within the mixing element again. This design feature has a profound influence on shear flow, degree of distributive mixing, and resulting mixed-ness and morphology. These attributes result in enhanced mixing of a variety of materials systems, including polymer blends and polymer-based composite materials, which are then fed through an IM machine.

Figure 8:
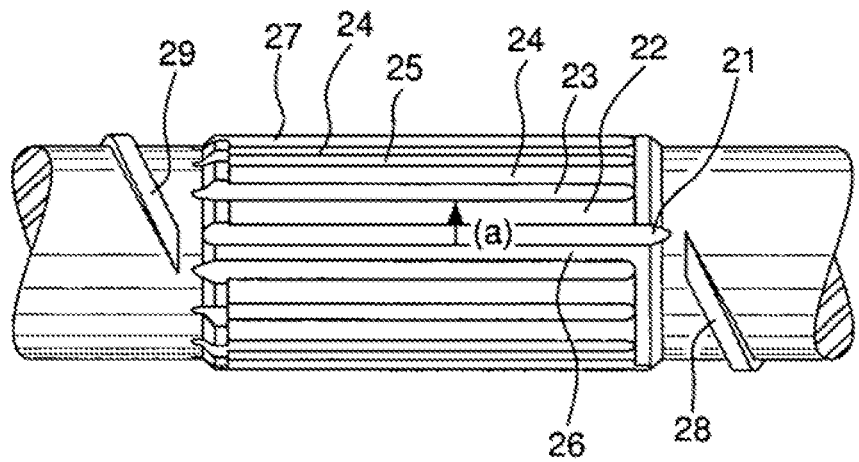
FIG. 8 is a side elevation showing an axial fluted extensional mixing element in accordance with the invention.
Figure 9:
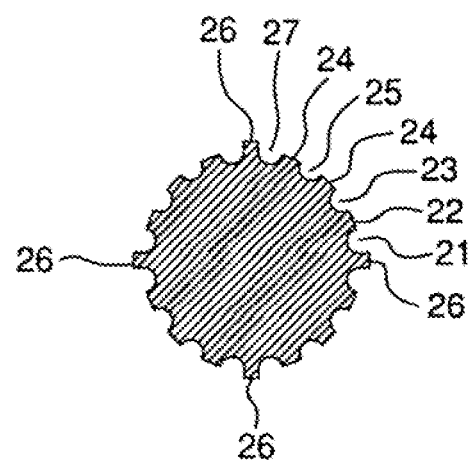
FIG. 9 is a sectional view of the axial fluted extensional mixing element of FIG. 8.

The axial fluted extensional mixing element in accordance with the invention comprises an inlet channel 21, conveying material to a first cross-axial pump 22. Cross-axial pump 22 reorients the material in planar shear while pumping into Intermediate channel 23. Intermediate channel 23, which is in fluid communication with inlet channel 21, conveys material to to subsequent cross-axial pump 24, where subsequent acceleration and further mixing takes place. Subsequent cross-axial pump 24 further reorients the material in planar shear while pumping material to subsequent intermediate channel 25, which is in fluid communication with intermediate channel 23. After subsequent mixing and pumping, material is delivered to outlet channel 27, which is in fluid communication with intermediate channel 25. The cross-axial pumps 22 and 24 pump the mixture at an angle (see. FIG. 8), and draw of the material from the channels 21, 23, 25 until the supply is exhausted.

In certain embodiments, at least one inlet channel or outlet channel is bound on one side by a substantially axially disposed blocking wall that substantially prevents material from flowing therepast. In one embodiment, this is a flight such as flight 26 of FIG. 6(b) of U.S. Pat. No. 6,962,431 having a small radial clearance from the extruder housing, thereby restricting flow and promoting flow down and along the outlet channel.

The enhanced mixing is obtained even with axial fluted extensional mixing elements with short length to diameter ratios, making it possible to configure the plastication unit of an injection molding system with a mixing element to mix together an injection molding composition as part of the injection molding process. Mixing element segments with length to diameter ratios of less than 30:1 can be used. Mixing element segment of plastication screws according to the present invention typically have length to diameter ratios between about 12:1 and about 30:1.

Any single polymer or polymer blend (e.g. two or more polymers) suitable for use in an injection molding machine can be used in the present invention. Suitable polymers include thermoplastic polymers (i.e. polymers that soften or liquefy upon heating and solidify when cooled and can be repeatedly softened/liquefied upon exposure to heat) and thermoset polymers (i.e. polymers formed from softened or liquefied prepolymers that irreversibly cure to form thermoset polymers upon exposure to heat and/or radiation).

Blends of thermoplastic or thermoset polymers can also be used in the present invention. Exemplary polymeric starting materials and amounts for use in the methods of the present invention include those disclosed in U.S. Pat. Nos. 5,298,214 and 6,191,228 for blends of a high-density polyolefin and polystyrene, U.S. Pat. Nos. 5,789,477 and 5,916,932 for blends of a high-density polyolefin and thermoplastic-coated fiber materials, U.S. Publication No. 2005/0192403 for blends of high-density polyolefin (e.g. high density polyethylene) and acrylonitrile-butadiene-styrene and/or polycarbonate, International Publication No. WO 06/125111 for blends of a high-density polyolefin and poly (methyl methacrylate) and No. WO 09/117,509 for blends of poly(trimethylene terephthalate) (PTT) and poly(methylmethacrylate) (PMMA). The disclosures of all seven patents and applications are incorporated herein by reference. Additional polymeric starting materials include poly(tri-methylene terephthalate) and poly(methylmethacrylate), polycarbonate and poly(tri-methylene terephthalate), and polystyrene and poly(trimethylene terephthalate).

Additional polymeric starting materials useful in the present invention include those disclosed in U.S. Pat. Nos. 4,663,388; 5,030,662; 5,212,223; 5,615,158 and 6,828,372. The contents of all five patents are incorporated herein by reference.

Conventional compounding additives can be combined with the polymer(s) prior to extrusion. Suitable additives for the polymers or polymer-based composite materials include pigments, colorants, modifiers, fillers, particles, reinforcing agents (e.g. fiberglass), and the like.

Output from the IM machine can be used to fabricate polymer components or added to neat polymer in a standard IM machine. For example, colorant or pigment can be combined with one or more polymers using the method of the present invention to prepare a masterbatch that is later added to neat polymer prior to injection molding with the neat polymer.

The following non-limiting examples set forth herein below illustrate certain aspects of the invention.

EXAMPLES

Starting Materials

Two components were used for the experimental mixing study, including fiberglass (FG) and polytrimethylene terephthalate (PTT). The FG is typical micron-sized E Glass (d=20 microns, L=4 mm) PTT is a unique thermoplastic polymer, manufactured by DuPont, based on 1,3-propanediol. It contains 20-37 wt. % renewably sourced material. Its beneficial properties, similar to high-performance poly-butylene terephthalate, are derived from a unique, semi-crystalline molecular structure featuring a pronounced "kink." PTT has a melting temperature between 226-233° C. and a specific gravity of 1.3-1.5.18)

Figure 1:
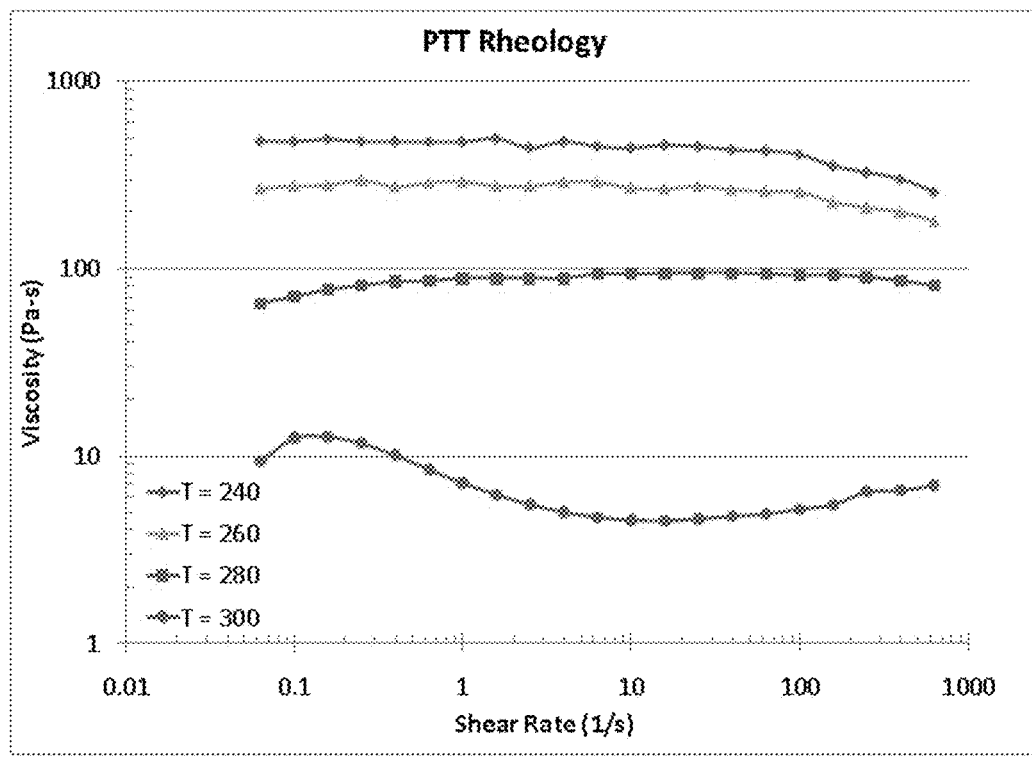
FIG. 1 is a plot of shear rate versus viscosity for polytrimethylene terephthalate (PTT) at temperature (T)=240, 260, 280, and 300° C.

Viscosity-shear rate for PTT resin is shown in FIG. 1 as a function of temperature. A frequency sweep from 100-0.01 Hz at 3.5% strain and temperatures of 240, 260, 280 and 300° C. was performed using a TA Instruments AR 2000. Viscosity-shear rate data was generated by performing a Cox-Merz transformation of the frequency sweep data at each temperature.

Processing Methods

Three processing methods for producing a FG-PTT composite were compared and termed "prior art," "two-step" and the "method of the present invention." For each method, 0, 10, 15, 20, and 30% FG in PTT were blended using a Negri Bossi V55-200 IM machine operated between 240-250° C. The prior art method involved dry-blending FG and PTT in the selected composition ratios followed by melt blending using a standard IM screw in the IM machine. The two-step method involved pre-compounding FG and PTT using a Randcastle Microtruder SSE fit with three AFEM elements, pelletizing, and a second processing step to achieve part fabrication using a standard IM screw in the IM machine. For the method of the present invention, the FG-PTT components were dry-blended followed by IM using a screw fit with one AFEM. The inventive method is a one-step processing method, in which compounding and part fabrication occurs in one processing step.

The FG-PTT composites produced by the three processing methods were characterized by mechanical and impact properties. Tensile mechanical properties were determined using a MTS QTest/25 Elite Controller with a 5 kN load cell and extensometer, according to ASTM D638. Modulus, ultimate tensile strength (UTS), load at UTS, percent strain at UTS, percent strain at fracture, and modulus were calculated. Izod impact properties were determined using an instrumented Instron Dynatup POE 2000 Impact Tester, according to ASTM D256.

Results

Tensile mechanical properties were determined and compared for the FG-PTT composite samples prepared by three different processing methods. The tensile modulus, ultimate tensile strength (UTS), % strain at fracture and total energy absorbed are presented graphically as a function of % FG in PTT in FIGS. 2-5, respectively. The prior art and two-step methods and the method of the present invention are represented by blue diamonds, red squares and green triangles, respectively. The error bars indicate the standard deviation per sample. The 0% FG samples did not fracture for all three processing methods therefore, the percent strain at fracture is not shown in FIG. 4. The total energy absorbed in FIG. 5 corresponds to the energy absorbed up to the UTS.

Izod impact properties were determined and compared for the FG-PTT com-posites prepared by three different processing methods. The impact energy and peak load as a function of % FG are shown graphically in FIGS. 6 and 7, respectively. The prior art and two-step methods and the method of the present invention are represented by blue diamonds, red squares and green triangles, respectively. Error bars indicate standard deviation per sample.

Figure 2:
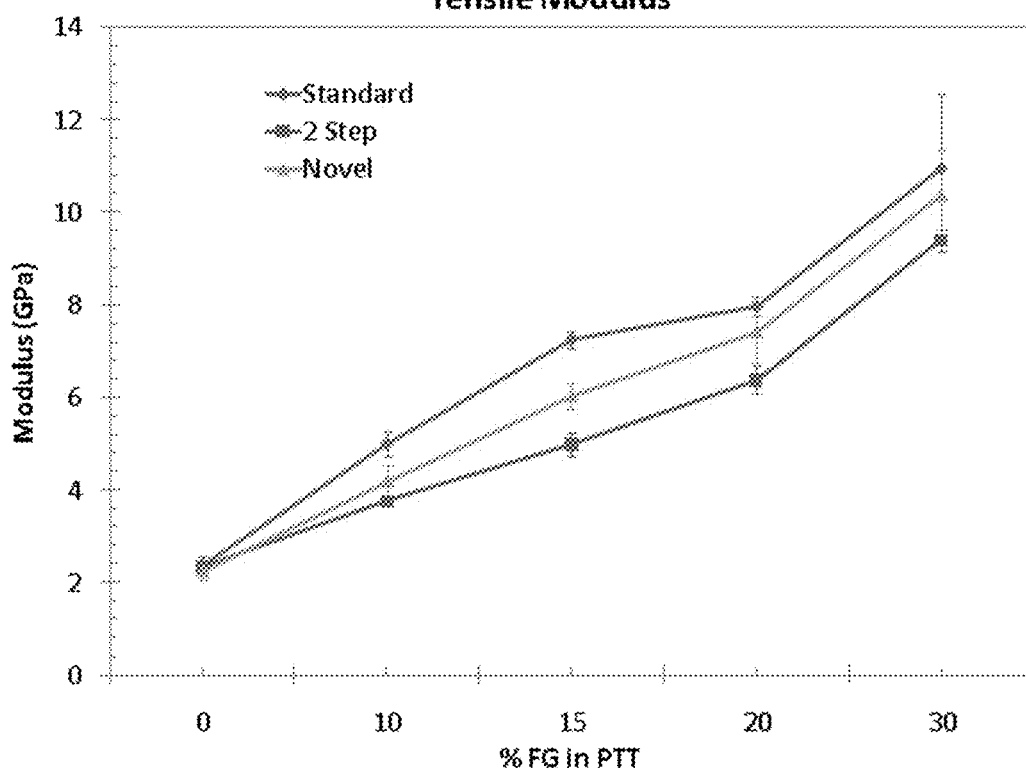
FIG. 2 is a tensile modulus comparison of fiberglass (FG)-PTT processed by prior art (Standard) and two-step (2-Step) methods and the method of the present invention (Novel)
Figure 3:
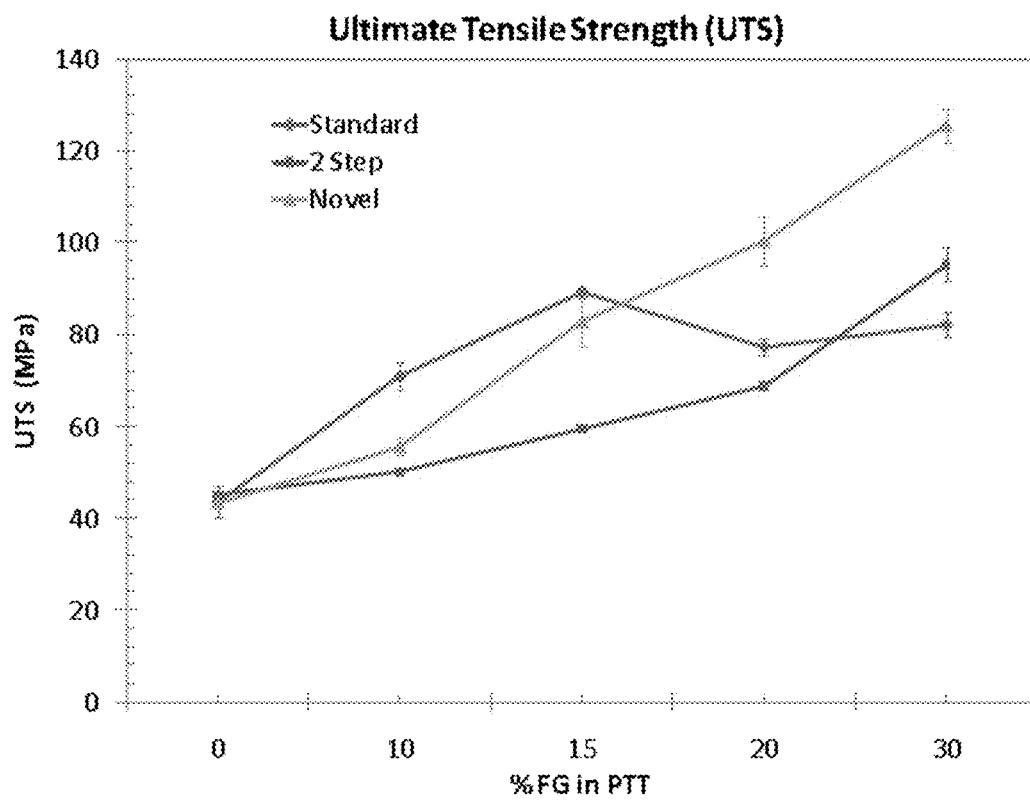
FIG. 3 is an ultimate tensile strength (UTS) comparison of FG-PTT processed by prior art and two-step methods and the method of the present invention.

For all three processing methods, the tensile modulus increases with % FG in PTT from about 2.3 to 11 GPa (FIG. 2). The prior art method produced a composite with the highest modulus for all compositions, followed by the inventive and two-step methods. However, the differences at each % FG are not significant when noticing the standard deviation indicated by the error bars. The UTS increases with % FG in PTT for both the inventive (43-126 MPa) and two-step (45-95 MPa) methods but only increases up to 15% FG for the prior method (44-89 MPa) as shown in FIG. 3.

Figure 4:
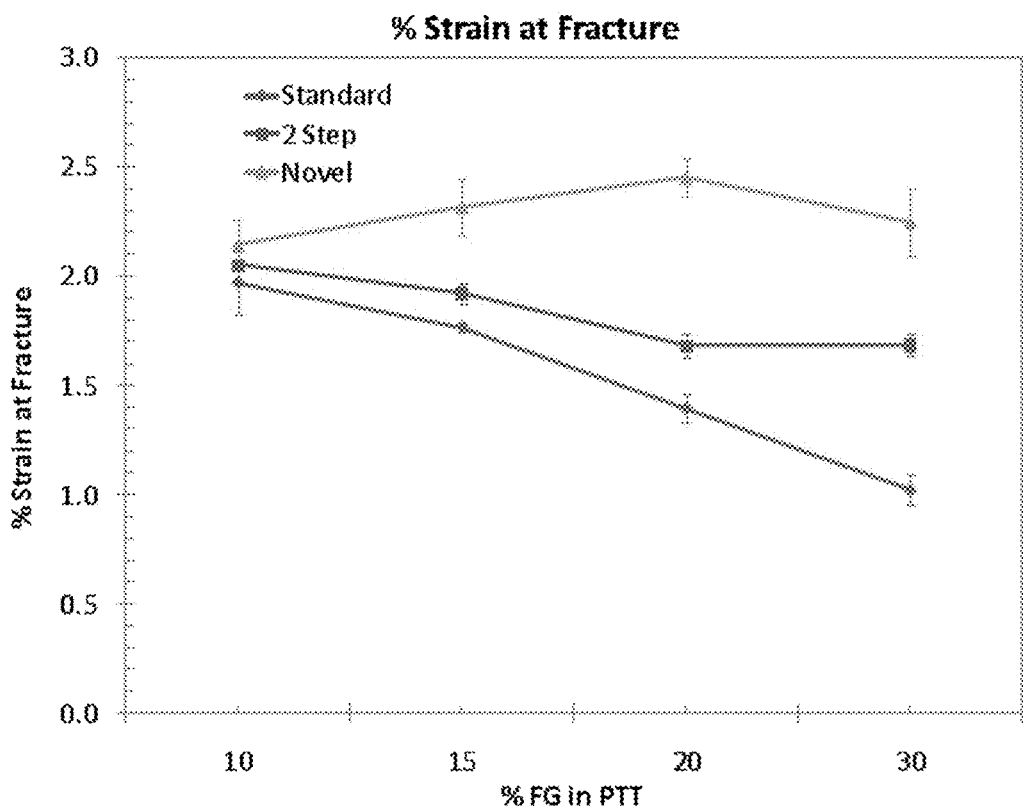
FIG. 4 is a percent strain at fracture comparison of FG-PTT processed by prior art and two-step methods and the method of the present invention.
Figure 5:
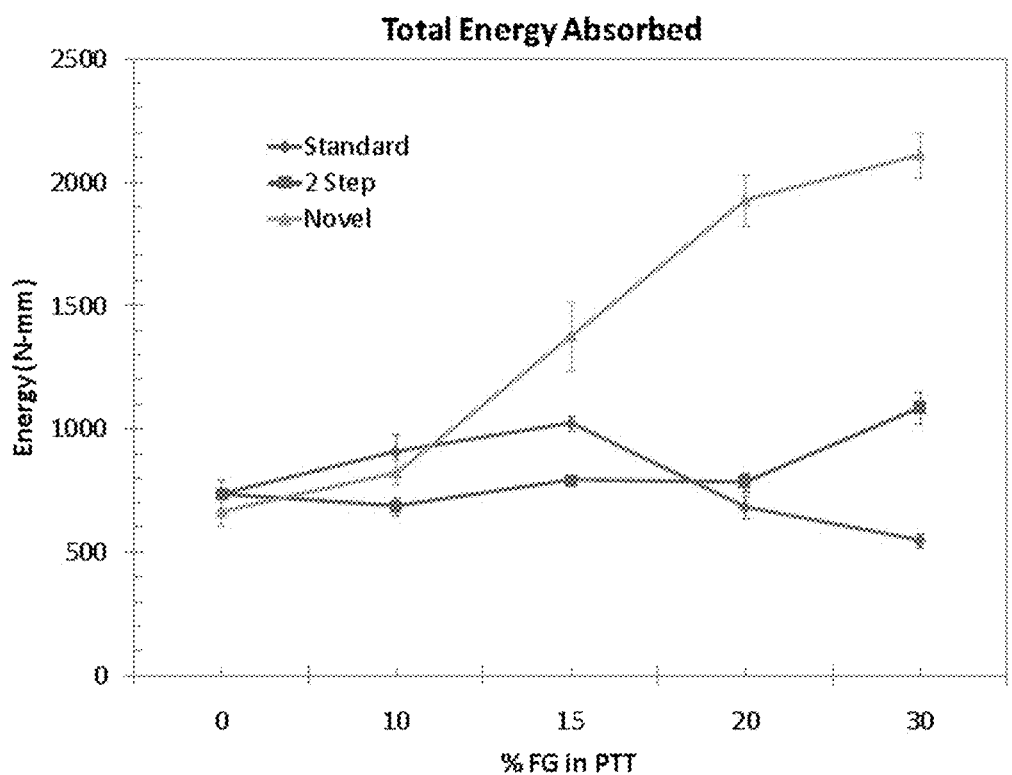
FIG. 5 is an energy absorption comparison of FG-PTT processed by prior art and two-step methods and the method of the present invention.

The % strain at fracture decreases with % FG in PTT for both the prior art and two-step methods (FIG. 4). However for the inventive method, the % strain at fracture increases with % FG up to 20% FG, remains above the 0% FG value at 30% FG, and is greater at all compositions than the % strain at fracture of the prior art and two-step methods. The total energy absorbed increases slightly up to 15% FG (740-1020 Nmm) for the prior art method and is below the 0% FG value at 20 and 30% FG (FIG. 5). For the two-step method, the energy absorbed is relatively constant from 0 to 20% FG (averaging at 750 Nmm) and actually increases at 30% FG (1090 Nmm). For the inventive method, the energy absorbed increases with % FG (665-2110 Nmm).

The inventive processing method produces a FG-PTT composite with enhanced ductility and toughness, as compared to the prior art and two-step methods. Ductility is directly proportional to the percent strain at fracture and toughness is related to the energy absorbed. Ductility and toughness are dependent upon the morphology and resulting mixed-ness. A fine morphology and good mixed-ness produces a composite with high ductility and toughness, while a coarse morphology or poor mixed-ness results in smaller percent strain at fracture and less energy absorbed. This also applies to immiscible polymer blends when using the AFEM element.

The AFEM incorporated into the IM screw according to the present invention produces very good dispersive and distributive mixing to impart enhanced mixed-ness. As molten polymer enters the AFEM, the material is under little to no axial pressure. Material that enters the flute of the AFEM is elongated across the flute tip where it experiences almost completely pure shear with elongational flow, analogous to laminar plane flow. Uniform shear produces uniform distributive mixing and high levels of mixed-ness. Once material exits the outlet flute it may move axially downstream along the length of the screw or upstream and re-enter the AFEM for additional mixing.

Figure 6:
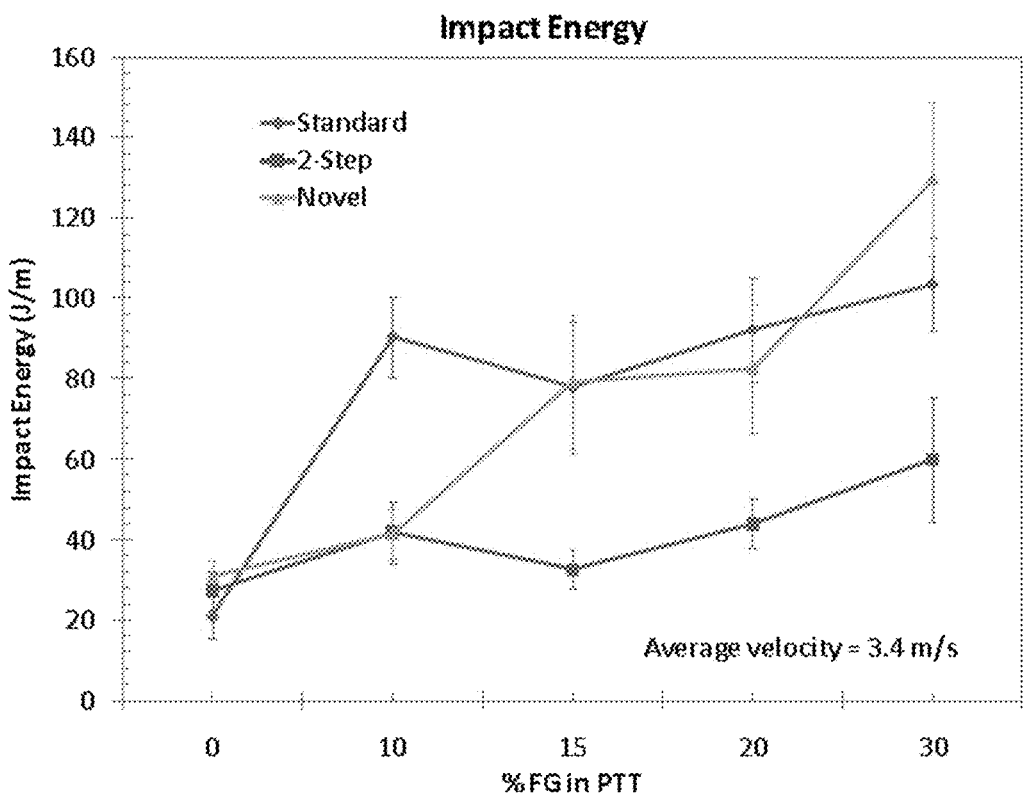
FIG. 6 is an Izod impact energy comparison of FG-PTT processed by prior art and two-step methods and the method of the present invention.
Figure 7:
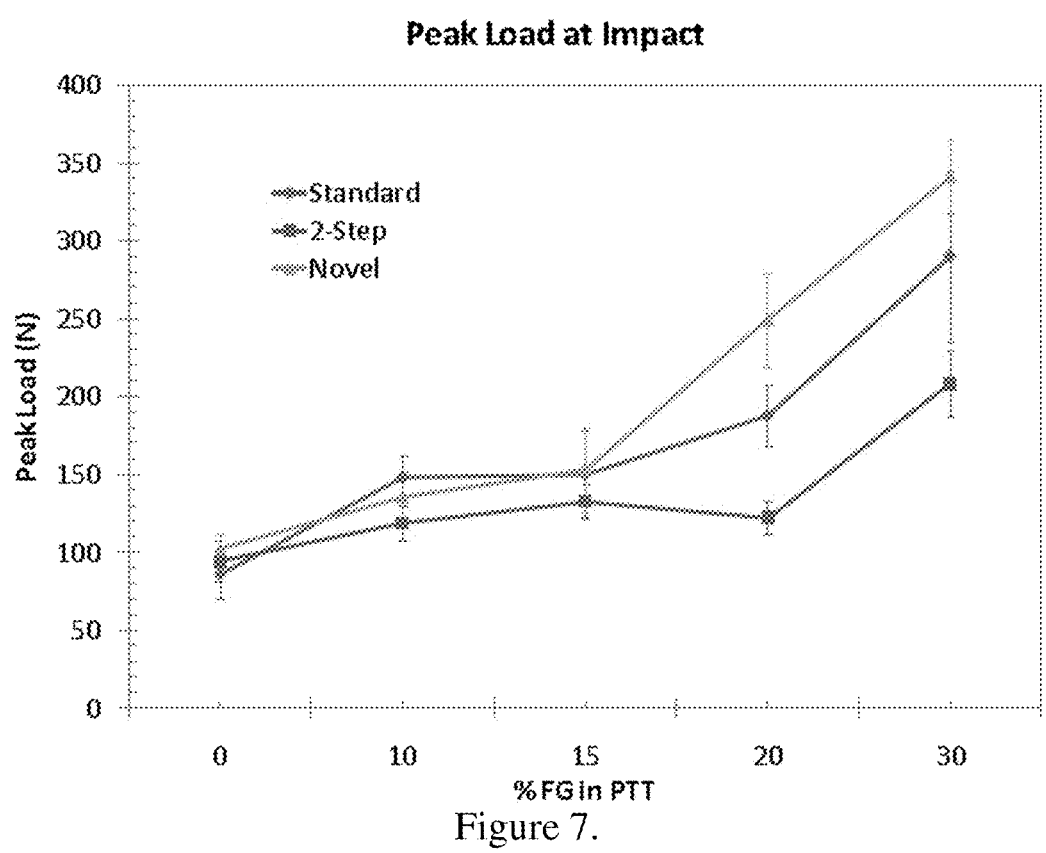
FIG. 7 is a peak load during impact comparison of FG-PTT processed by prior art and two-step methods and the method of the present invention.

The impact energy and peak load at impact increases with % FG for all three processing methods (FIGS. 6 and 7). The inventive method (31-130 J/m) incurs the most significant increase in impact energy, followed by the prior art method (21-104 J/m), and lastly, the two-step method (27-60 J/m). The peak load at impact follows the same trend between all three processing methods, with the increase being most significant for the inventive, prior art and then two-step method. Upon observation of fracture surfaces, it is evident the fibers in the prior art samples de-bonded from the PTT matrix while the fibers in the two-step and inventive samples sheared along with the PTT matrix.

Accordingly, a successful one-step processing method was developed and achieved a well mixed FG-PTT composite with enhanced ductility and toughness without sacrificing modulus and UTS. This method may be translated to polymer blends and other polymer-based composites to aid the polymer manufacturing Industry to save costs and energy associated with traditional two-step pre-compounding followed by part fabrication manufacturing methods.

The foregoing examples and description of the preferred embodiment should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. An injection molding machine, comprising:
 a mold cavity;
 a heated plastication barrel comprising an entrance port and an exit port on opposing ends of said barrel, said exit port positioned to deliver ingredients compounded for injection molding to said mold cavity;
 a hopper positioned to deliver ingredients to be compounded for injection molding to the entrance port of said barrel; and
 a helical plastication screw rotatably carried within said barrel and running the length of said barrel between said entrance and exit ports, which is operable to rotate and transmit said ingredients along the length of said barrel;
 wherein said plastication screw comprises at least one axial fluted extensional mixing element segment comprising:
  (i) at least one inlet channel having an upstream inlet and at least one outlet channel having a downstream outlet in fluid communication with each other, both the inlet channel and the outlet channel being bound on one side by a substantially axially disposed blocking wall which substantially prevents material from flowing therepast,
  (ii) a plurality of intermediate channels disposed between and in fluid communication with said inlet and outlet channels, said intermediate channels lacking upstream inlets and downstream outlets, and (iii) cross-axial pump members configured to advance ingredients between adjacent channels at an angle to the extruder axis and disposed between each channel.

2. The injection molding machine of claim 1, wherein said plastication screw further comprises a conveyor segment positioned to receive said ingredients to be compounded from said hopper and to convey said ingredients to said mixing element segment.

3. The injection molding machine of claim 1, wherein said mixing element segment has a length to diameter ratio of less than 30:1.

4. The injection molding machine of claim 3, wherein said mixing element segment has a length to diameter ratio between about 12:1 and about 30:1.

5. The injection molding machine of claim 1, wherein said plastication screw further comprises a second conveyor segment positioned to receive compounded ingredients from said mixing element segment and to convey said compounded ingredients in the direction of said exit port.

6. The injection molding machine of claim 5, wherein said plastication screw further comprises a second axial fluted extensional mixing element segment positioned between said second conveyor segment and said exit port to receive said compounded ingredients for further mixing.

7. The injection molding machine of claim 6, wherein said barrel further comprises an intermediate port positioned to deliver additional ingredients to be compounded either to said second conveyor segment or to said second mixing element segment.

8. The injection molding machine of claim 7, further comprising a second hopper positioned to deliver said additional ingredients to said intermediate port.

9. The injection molding machine of claim 6, wherein said plastication screw further comprises a third conveyor segment positioned to receive compounded ingredients from said second mixing element segment and to convey said compounded ingredients to said exit port.

10. An injection molding method comprising:
feeding a blend of ingredients to be compounded for injection molding comprising at least one polymer to the entrance port of the injection molding machine of claim 1,
wherein the barrel of said unit is heated above the compounding temperature of said blend; and
transmitting said blend along the length of said heated barrel with the plastication screw of said plastication unit, so that the ingredients are heated to a flowable state for injection molding and mixed by a mixing element segment of said plastication screw to form a uniform homogenous flowable mass of a composition for injection molding.

11. The method of claim 10, further comprising the steps of directly delivering said flowable mass from the exit port of the barrel of said injection molding machine into a mold cavity; and forming a molded article.

12. The method of claim 10, wherein said blend of ingredients comprises a thermoplastic polymer.

13. The method of claim 10, wherein said blend of ingredients comprises a blend of two or more polymers.

14. The method of claim 13, wherein two or more of said polymers are immiscible.

15. The method of claim 10, wherein said blend of ingredients comprises at least one polymer for injection molding and one or more compounding additives.

16. The method of claim 15, wherein said compounding additives are independently selected from the group consisting of pigments, colorants, modifiers, fillers, particles and reinforcing agents.

17. The method of claim 16, wherein said reinforcing agents comprise reinforcing fibers.

18. The method of claim 17, wherein said reinforcing fibers comprise glass fibers.

19. A molded plastic article formed by the method of claim 11.

* * * * *